July 7, 1964
W. D. DIEMER
3,139,691
PROJECTOR AND SLIDE TRAY THEREFOR
Filed Oct. 9, 1959
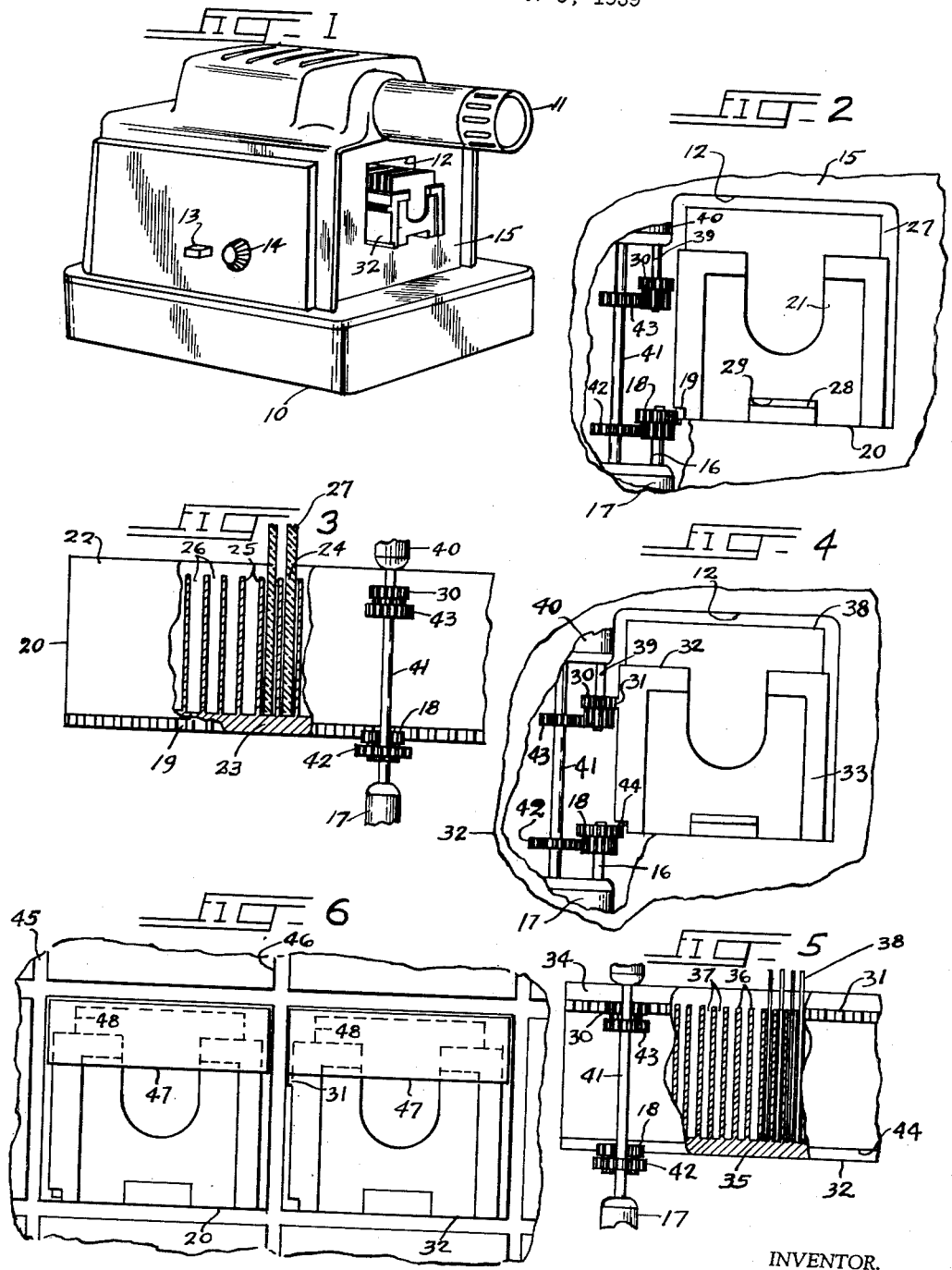
INVENTOR.
WILLAM D. DIEMER
BY Samson, Tilton, Fallon
& Lungmus.

United States Patent Office 3,139,691
Patented July 7, 1964

3,139,691
PROJECTOR AND SLIDE TRAY THEREFOR
William D. Diemer, 5132 S. Greenwood, Chicago, Ill.
Filed Oct. 9, 1959, Ser. No. 845,368
1 Claim. (Cl. 40—79)

This invention relates to the mechanism for advancing trays of slide transparencies through an automatic or semi-automatic slide projector.

Film transparencies for use in slide projectors are generally mounted by film processors in cardboard frames or mounts which are approximately 0.05 inch in thickness. While a large proportion of owners store and project their film transparencies in their original cardboard frames, others follow the recommendations of film manufacturers and processors and re-mount their transparencies between thin plates of glass to preserve them from the deleterious effects of intense light, heat, humidity and air-borne dust, such effects being most pronounced when the transparencies are exposed for projection. However, the re-mounting of a transparency between protective glass plates generally increases the thickness of the slide, the glass-covered slide being about twice the thickness of the cardboard-framed counterpart. Furthermore, prepared glass slides on a variety of subjects are now commercially available and range up to 0.15 inch or even greater in thickness.

As a result, all slide trays for automatic and semiautomatic projectors are made with slots or pockets wide enough to accommodate the thickest glass-mounted slides. Generally, these pockets are about 0.19 inch wide with septums therebetween of about 0.04 inch thick. While such trays are well suited for use in projecting and storing heavy glass or glass-covered slides, it is apparent that because of their large pockets, a considerable amount of storage space is wasted when such trays are used only to support thin cardboard-mounted transparencies for storage and projection. From the dimensions already given, it will be seen that conventional trays which now store thirty slides would be capable of holding fifty to seventy cardboard-framed slides if the pockets or slots of the trays were tailored to accommodate only the latter-type of slide. This would not only conserve storage space but would also permit a larger number of slides to be projected upon the insertion of a tray into an automatic or semi-automatic projector. Projectors capable of properly advancing such large capacity trays could be constructed, using well-known principles. The problem, however, lies in providing a tray of large slide capacity which may be interchanged with other conventional slide trays during projector operation, and in adapting or providing a projector with advancing means capable of cooperating with either type of tray.

Accordingly, it is an object of the present invention to provide a projector capable of receiving and advancing either the currently available slide trays with wide slots or high capacity slide trays having narrower slots. A further object is to provide a tray-advancing mechanism of a projector which is capable of automatically discriminating between trays of different pocket dimensions and slide-carrying capacity so as to advance each type of tray at the proper speed through the projector tunnel.

For a more complete understanding of the nature and scope of this invention, reference may be had to the following detailed description, taken together with the accompanying drawing, in which:

FIGURE 1 is a perspective view showing a slide projector supporting a slide-carrying tray embodying the present invention;

FIGURE 2 is a fragmentary front elevational view of the projector shown in FIGURE 1, the front wall of the projector being broken away in part to illustrate the advancing mechanism engaging a slide tray embodying the present invention;

FIGURE 3 is a broken slide elevational view of the structure shown in FIGURE 2, all supporting and nonessential structural elements of the projector being removed to illustrate clearly the cooperative relationship between the advancing mechanism and a conventional slide tray;

FIGURE 4 is a fragmentary front elevational view of the projector similar to FIGURE 2 but showing the advancing mechanism in cooperation with a slide tray embodying the present invention;

FIGURE 5 is a broken slide elevational view similar to FIGURE 3 but showing the advancing mechanism engaging a high-capacity tray of the present invention;

FIGURE 6 is a fragmentary end view of a conventional tray and a tray embodying the present invention, both trays being mounted within the compartments of a conventional storage case and both being provided with identical lids of covers.

Referring to the drawings, FIGURE 1 shows a conventional automatic slide projector generally designated by the numeral 10, the projector having a lens 11, slide tray tunnel 12 and controls 13 and 14 for optional manual control of slide ejection and for regulating the rate of automatic tray advancement. Since the projector is entirely conventional in these respects and since the structure and operation of projectors are well-known in the art, a more detailed description of the elements not directly related to the present invention is believed unnecessary herein.

Behind the face plate 15 of the projector and adjacent tunnel 12 is a power driven vertical shaft 16, shown most clearly in FIGURES 2 and 4. The shaft is rotated by the projector's electric motor and a suitable automatic clutch (not shown) is provided for intermittently interrupting rotation of the shaft so that a slide tray advanced by the mechanism will be arrested for the duration of projection time of each slide when each of the pockets is successively disposed adjacent the slide ejecting mechanism (not shown). Shaft 16 is carried by a mounting 17 which restrains it from all movement except axial rotation. At the top of shaft 16 is a tray advancing or driving gear 18 which meshes with the gear track or rack 19 provided along a lower longitudinal edge of slide tray 20 (FIGURES 2 and 3).

The elongated tray 20 of FIGURES 2 and 3 is entirely conventional and is provided with end walls 21, side walls 22 and bottom wall 23. Within the cavity 24 of the tray are a plurality of transverse partitions 25 which define compartments or pockets 26 for supporting slides 27. As illustrated by the cutaway portion of FIGURE 3, compartments 26 are relatively wide to accommodate the thick glass slides 27. It will be understood, of course, that relatively thin paper mounted film transparencies may also be carried within compartments 26 but that in such a case there will be a substantial amount of wasted space within each pocket because of the dimensional differences between the width of the pocket and the thickness of the slides.

The tray 20 is slidably guided through the tunnel upon a track element 28 which is provided by the projector along the bottom of the tunnel 12 and which is slidably received in a longitudinal recess 29 extending longitudinally along the bottom of the tray.

All of the structure so far described is entirely conventional and is representative of the slide tray and projector units which are presently commercially available. For the reasons already mentioned, the typical tray represented by the numeral 20 is not well adapted to support thin cardboard-framed slides for storage and projection because of the considerable amount of wasted space in each of the slide-carrying pockets. The following description will now set forth an alternative tray construction along with means which adapt a projector for automatically and interchangeably handling both types of trays.

In FIGURES 2 through 5, it will be seen that there is a second drive gear 30 disposed above drive gear 18 which has teeth so spaced and proportioned as to properly engage a longitudinally-extending side gear track 31 of an alternate slide-carrying tray 32 (FIGURES 4 and 5). Like tray 20, tray 32 is provided with end walls 33, side walls 34, recessed bottom wall 35 and partitions 36. However, partitions 36 are spaced relatively close together to define narrow pockets or compartments 37 for receiving and supporting thin cardboard-framed film transparencies or slides 38. Compartments 37 are of uniform width and are approximately 0.1 inch in width. However, pocket sizes ranging between 0.05 and 0.15 inch in width may also be suitable for this purpose. With pockets of the preferred width of 0.1 inch, it will be seen that the slide carrying capacity for the tray illustrated in FIGURES 1, 4 and 5 will be approximately 50% greater than the conventional wide-compartment tray shown in FIGURES 2 and 3.

Gear 30 is supported for rotation about a vertical axis by a shaft 39 carried by mounting 40. In the illustration given, shaft 39 is parallel with drive shaft 16 and the gear 30 is coupled for rotation by the drive shaft by an auxiliary shaft 41 extending between mountings 17 and 40 and having a pair of gears 42 and 43 in mesh with portions of gears 18 and 30 respectively. Thus, both the upper and lower gears 30 and 18 rotate simultaneously and in the same direction upon rotation of drive shaft 16.

While gears 18 and 30 are shown as being mounted on separate parallel shafts, it may be possible in some constructions to mount both gears on the same shaft, drive shaft 16 being extended upwardly for that purpose. Such a construction is possible where the pitch radius of the gear 30 equals the horizontal distance between the pitch lines of the two gears multiplied by the number of pockets in a standard tray and divided by the difference in the number of pockets between trays 20 and 32. Since the feasibility of such an arrangement depends on the relative number of pockets in trays 20 and 32 and since the lateral dimensions of rack gear 31 is an important consideration in connection with the storage of the high-capacity tray, I have shown in the drawings a gear arrangement which is capable of meeting all of the operational and structural requirements for effective utilization of the present invention.

In FIGURES 4 and 5 it will be seen that tray 32 is provided with a longitudinal groove or recess 44 disposed in the same location as the gear track 19 of conventional tray 20. Thus, when tray 32 is advanced through the tunnel 12 of the projector, the lower edge of the tray completely clears drive gear 18. This is necessary because both the primary and secondary drive gears 18 and 30 are operatively connected for simultaneous rotation. An important advantage in this construction lies in the fact that the same power means drives both of the gears and renders it unnecessary to provide a second motor to rotate the upper gear.

Referring to FIGURE 6, there is shown a portion of a conventional storage case 45 having compartments 46 which receive slide trays when they are not in use. Tray 20 is provided with a cover 47 which fits over the top of the tray and the slides contained therein and which has depending side walls 48 terminating intermediate the upper and lower edges of the tray. Such a cover is conventional and is fully described and illustrated in Badalich Patent No. 2,774,472.

Like tray 20, tray 32 fits snugly within a compartment 46 of case 45 and is similarly equipped with a cover 47. However, it will be noted that for storage in a compartment also capable of snugly receiving covered tray 20, the lateral gear track 31 of tray 32 can project only a limited distance from the side of the tray. Specifically, the teeth of track 31 should not project outwardly a significantly greater distance than the side wall thickness of cover 47, plus the tolerance of the cover 47; viz: the difference between the overall exterior width of tray 32 and the overall interior width between the side walls 48 of cover 47.

As shown most clearly in FIGURE 2, upper gear 30 is spaced laterally from the side wall of tray 20 so that when the tray is advanced through the tunnel by drive gear 18, gear 30 rotates freely without engaging that tray. To achieve this result, it is necessary that the teeth of gear track 31 of the alternate high-capacity tray 32 project outwardly from the side surface of that tray since, if the track were flush with the side face of the tray then gear 30 would interfere with advancement of a conventional tray through the tunnel.

It will be understood that the vertical orientation of gear track 31 may be at any level along the outside face of the tray's side wall 34 as long as suitable corresponding adjustment is made in the position of the upper gear 30 and as long as the placement of this track does not interfere with proper positioning of the protective lid 47 when the narrow-slot tray 32 is stored in case 45. The drawings illustrate what is considered to be the preferred position of gear track 31 for at least two reasons. First, it will be seen from FIGURE 6 that the track 31 provides an additional shoulder against which the bottom edge of cover side wall 48 may rest. Secondly, in the gear track position shown, the necessarily small teeth of the track are best protected from accidental damage. In all normal handling, except when the narrow-slot tray 32 is being placed in or removed from the projector 10, the protective lid 47 will ordinarily be in position. Since the thickness of the lid's side wall is substantially the same as the lateral dimensions of the teeth of track gear 31, the adjacent side wall of the cover tends to protect or shield the teeth of the tray.

Since the narrow-slot tray 32 does not advance as far from one projecting position to the next as a conventional wide-slot tray 20, it is apparent that the peripheral speed of the upper gear 30 is less than the corresponding speed of the lower gear 18. The precise rotational speed and diameter for gear 30 for a narrow-slot tray having compartments of a given width may be readily determined by applying basic gear reduction principles and by taking into consideration the pitch diameter and rotational speed of all of the gears, including transmission gears 42 and 43. It will be noted that if both the upper and lower gears are to be mounted on the same drive shaft 16, the drive shaft extending upwardly above gear 18 for this purpose, then gear 30 must have a smaller diameter than gear 18.

While in the foregoing I have disclosed an embodiment of the present invention in considerable detail for purposes of illustration, it will be understood by those skilled in the art that many of these details may be varied without departing from the spirit and scope of the invention as defined in the claim.

I claim:

In a slide projector having a tunnel for the movement of slide trays therethrough, a tray advancing mechanism adapted to operatively engage and alternately and individually advance through said tunnel a conventional wide-slotted tray having a gear track with laterally-projecting gear teeth along the lower edge thereof and a narrow-slotted tray having a lateral gear track with laterally-projecting gear teeth spaced above the lower edge thereof, said projector providing a first drive gear positioned and arranged to engage exclusively the lower gear track of said wide-slotted tray, said projector also providing a second drive gear positioned and arranged to engage exclusively the lateral gear track of said narrow-slotted tray, means provided by said projector for rotatably supporting said first and second drive gears for rotation in spaced planes each extending parallel with the bottom surface of trays advancing through said tunnel, and means provided by said projector for simultaneously rotating said first and second gears in the same direction, said second drive gear having a slower peripheral speed of rotation than said first drive gear, said means for supporting said gears comprising a power-driven first shaft supporting said first drive gear, and a second shaft disposed above said first shaft and rotatably supporting said second drive gear.

References Cited in the file of this patent

UNITED STATES PATENTS

| | | |
|---|---|---|
| 2,460,359 | Page | Feb. 1, 1949 |
| 2,919,021 | Robinson et al. | Dec. 29, 1951 |
| 2,854,888 | Kaye | Oct. 7, 1958 |
| 2,874,497 | Huff et al. | Feb. 24, 1959 |
| 2,900,074 | Windman | Aug. 18, 1959 |
| 2,969,711 | Robinson | Jan. 31, 1961 |